(12) United States Patent
Britt (10) Patent No.: US 8,108,511 B2
(45) Date of Patent: Jan. 31, 2012

(54) ABSTRACTION OF MULTIPLE AGGREGATED PHYSICAL COUNTERS INTO A VIRTUAL COUNTER

(75) Inventor: Steven V. Britt, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1256 days.

(21) Appl. No.: 11/441,694

(22) Filed: May 26, 2006

(65) Prior Publication Data

US 2007/0294394 A1 Dec. 20, 2007

(51) Int. Cl.
*G06F 13/00* (2006.01)
*G06F 15/173* (2006.01)

(52) U.S. Cl. ........................ 709/224; 370/242; 370/252

(58) Field of Classification Search ........... 709/223–226
See application file for complete search history.

(56) References Cited

U.S. PATENT DOCUMENTS

| | | | | |
|---|---|---|---|---|
| 4,817,080 | A * | 3/1989 | Soha | 370/252 |
| 5,649,129 | A * | 7/1997 | Kowert | 710/305 |
| 5,872,976 | A * | 2/1999 | Yee et al. | 717/127 |
| 6,263,361 | B1 * | 7/2001 | Hoyer et al. | 709/203 |
| 2005/0030978 | A1 * | 2/2005 | Dropps et al. | 370/512 |
| 2007/0112575 | A1 * | 5/2007 | Savoor et al. | 705/1 |

\* cited by examiner

*Primary Examiner* — Ian N Moore
*Assistant Examiner* — Thai Nguyen (57) ABSTRACT

An embodiment is directed towards a method of abstracting multiple embedded counters from a number of network devices for use in a network monitoring application. The method includes initializing a metacounter for network devices for categories of metacounts. The method further includes, per metacounter, initializing a constituent counter for applicable embedded counters within the respective network device. The constituent counter includes a constituent value. The method further includes updating the constituent value for the constituent counters. The method further includes obtaining a total value corresponding to the metacounters based on the constituent values of respective constituent counters, wherein said total value is used by the network monitoring application.

27 Claims, 7 Drawing Sheets

ABSTRACTION OF MULTIPLE AGGREGATED PHYSICAL COUNTERS INTO A VIRTUAL COUNTER

BACKGROUND OF THE INVENTION

Many electronic devices contain embedded counters that can be used to monitor state and/or performance of the containing device. The value of such a counter is typically retrieved by a software application at discrete points in time, with the difference between the resulting values (sometimes referred to as the "delta") being used to determine the rate at which an occurrence being reported by the counter is happening on, to, or around the device. These deltas and/or derived rates can subsequently be used for various purposes, typically to assess the health or efficiency of the device.

Such embedded counters are usually presented to a retrieving software application as unsigned hexadecimal values. An application that retrieves and interprets such counters must therefore be capable of correctly handling various conditions that may apply to each individual counter, such as the rollover of the counter's value from a large unsigned number to a small unsigned number due to a small number of counted occurrences. The proper treatment of counters is well understood and fairly common within certain types of software applications (e.g. network management applications).

It is the norm that software applications deal with each such counter of interest from a device by treating each one directly and distinctly from others, in terms of managing the counter value and computing deltas and rates. While it is atypical for retrieving software applications to combine the values of individual embedded counters, such aggregation can be quite useful when it is desired to combine and abstract the resulting counter deltas away from the specifics of the embedded counters that supplied them. One might wish to do this when using the aggregated counters to assess device behavior that encompasses a relatively broad criterion that is not represented by any single embedded counter within the device. For example, it might be desired to consider the total number of errors seen by a device rather than the more detailed counters that are typically provided to break out each possible type of error. This abstraction approach can also be used to "normalize" the statistics that are collected from disparate device types or models that fall within a common device class.

Almost all prior solutions tackle the situation of divergent embedded counters among supported device types or models by essentially avoiding entanglement in this area, which unfortunately limits their ability to perform analysis on the aggregated deltas. That is, it is atypical for most applications that deal with such embedded device counters to abstract and/or combine the counter deltas before performing analysis and/or presentation of the deltas. Normally the delta from each individual counter that a device type or model keeps is presented distinctly from all others to the user of a software application, with the burden of reconciling counter sets from divergent device types or models and the interpreting the resultant deltas falling upon the user. It is appreciated that this becomes quite difficult for the users of such applications when the supported device types or models become increasingly divergent from one another, as a common means of assessing device behavior and performance is quite difficult to derive if even possible at all.

One prior solution attempts to aggregate the raw, unsigned values that are retrieved from a device and then compute deltas using the resulting total. This minimizes the burden on a network management application as it does little but retrieve the appropriate values from each supported device type or model. Unfortunately this approach can yield incorrect results when more than one of the embedded counters being combined experiences a rollover at the same time; it becomes impossible to tell which counters rolled over and by how much, and even how many counters rolled over.

The most common prior solution simply requires the software application that is consuming the embedded counter values to be capable of dealing directly with disparate counter sets from various specific device types or models. This typically results in special casing and/or logic being scattered throughout the application to handle the quirks associated with each supported device type or model. It also limits the type of analysis and interpretation of the counter deltas and rates that the application itself is able to perform, as the counter sets are usually of divergent composition between device types or models.

SUMMARY OF THE INVENTION

An embodiment is directed towards a method of abstracting multiple embedded counters from a numbers of network devices for use in a network monitoring application. The method includes initializing a metacounter for network devices for categories of metacounts. The method further includes, per metacounter, initializing a constituent counter for applicable embedded counters within the respective network device. The constituent counter includes a constituent value. The method further includes updating the constituent value for the constituent counters. The method further includes obtaining a total value corresponding to the metacounters based on the constituent values of respective constituent counters, wherein said total value is used by the network monitoring application.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Generally speaking, embodiments of the present invention provide a means of aggregating multiple individual counters in an object-oriented and abstract way so that the resulting deltas of the discrete individual counters are always combined correctly and the behavior of the resulting "virtual" counter, encompassing the multiple individual counters, appears to the consuming software application to be independent of conditions that may affect the individual constituent counters that it contains. In this situation, only a small portion of the application must understand which specific counters are available from each specific device type or model and what the characteristics of each device type's or model's counters are in order to accurately formulate an aggregated "virtual" counter. The rest of the application can ignore the implementation details that pertain to a single device type or model and focus only on how to consume the resulting "virtual" counter values that result from the device-specific aggregation of embedded counters.

One embodiment is directed to a method of abstracting multiple embedded counters from a number of network devices for use in a network monitoring application. The method includes initializing a metacounter for each network device for each category of desired metacounts. Part of the metacounter initialization involves initializing its constituent counters, one for each applicable embedded counter within the respective network device. In one embodiment, the constituent counters comprise a constituent value. In one embodiment, the constituent counters also comprise an update value and a previous counter value. Once initialized, the constituent counters are updated periodically. When the application wishes to read the value of the metacount, the respective metacounter obtains a total value based on the constituent values of all its constituent counters and then provides the total value to the application.

Figure 1:
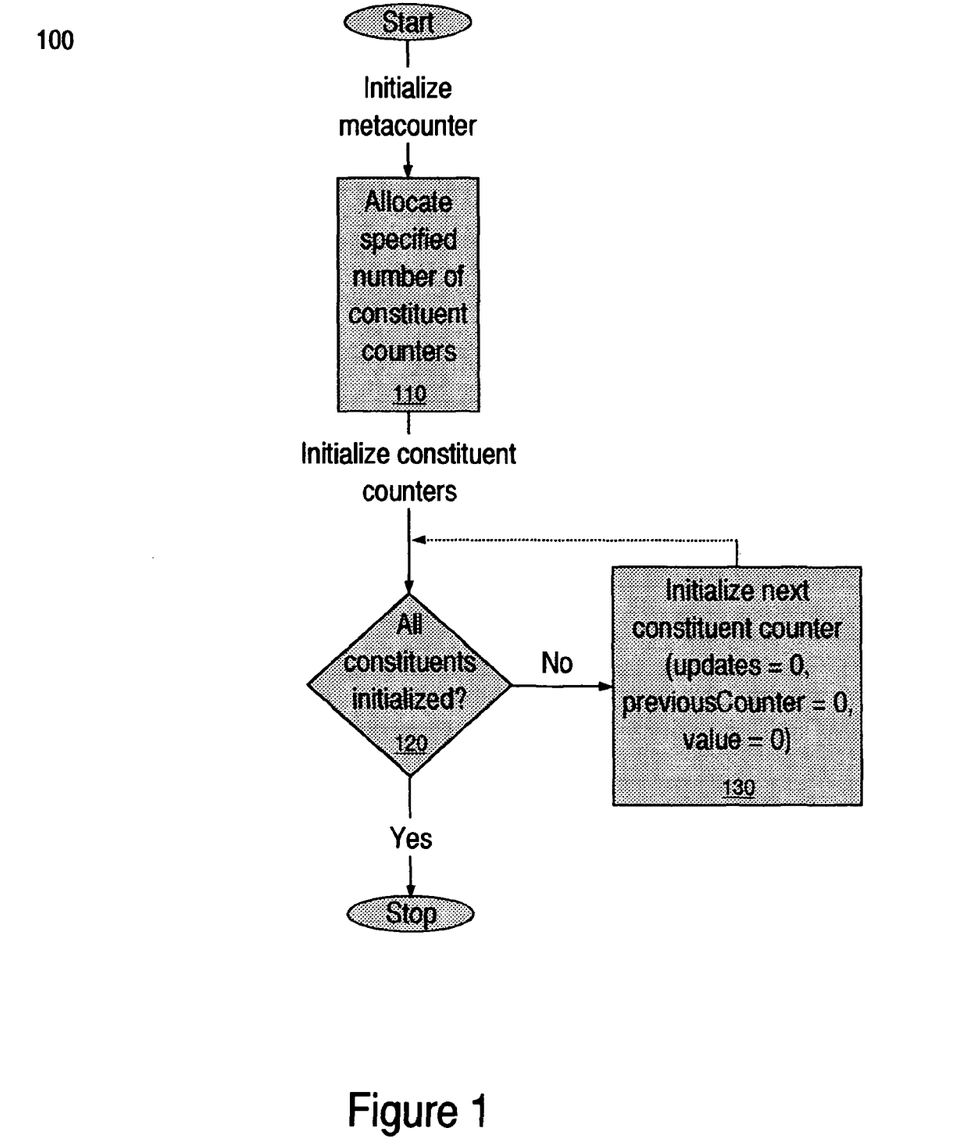
FIG. 1 shows a flowchart of the process 200 for initializing a metacounter and its respective constituent counters, in accordance with an embodiment of the present invention.

FIG. 1 shows a flowchart of the process 100 for initializing a metacounter and its respective contingent counters, in accordance with an embodiment of the present invention. At operation 110, the application allocates a specified number of constituent counters, where one constituent counter is initialized for each applicable embedded counter within the respective network device. At operation 120, the application then checks to see if all constituent counters have been initialized. If the condition is satisfied, the process 100 is complete. If the condition is not satisfied, process 100 proceeds to operation 130. At operation 130, the application initializes the next constituent counter by setting the update value to zero, the previous counter value to zero, and the constituent value to zero. The process 100 then returns to operation 120.

Figure 2:
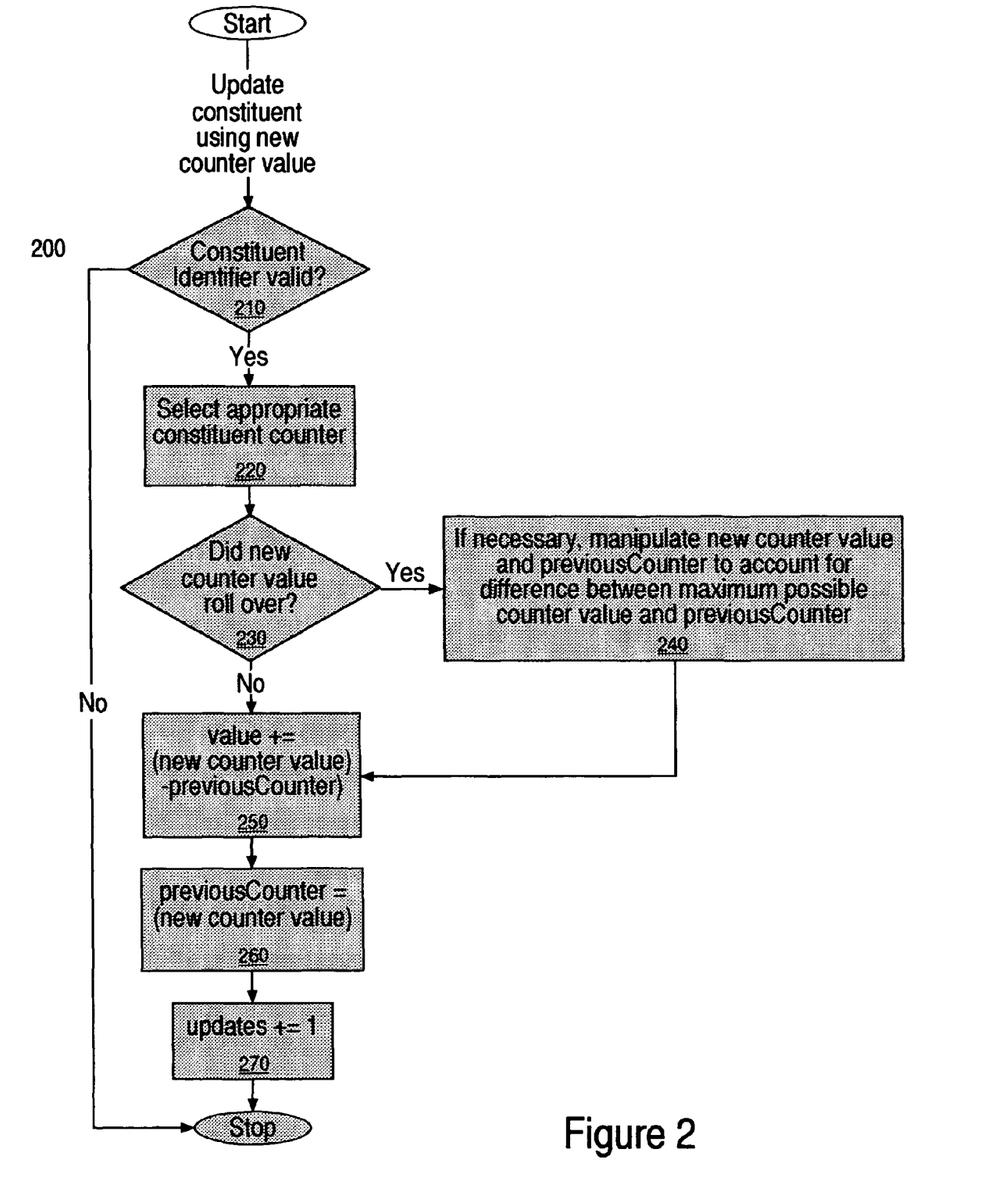
FIG. 2 shows a flowchart of the process for updating a constituent counter, in accordance with an embodiment of the present invention.

FIG. 2 shows a flowchart of the process 200 for updating a constituent counter, in accordance with an embodiment of the present invention. At operation 210, a determination is made as to whether the constituent identifier is valid. If it is not, process 200 terminates. If the identifier is valid, process 200 proceeds to operation 220. At operation 220, the application selects the appropriate constituent counter to be updated. At operation 230, the application determines whether the constituent counter experienced a rollover. If a rollover has been detected, the process 200 proceeds to operation 240, where the application manipulates the new counter value and the previous counter value to account for the difference between the maximum possible constituent value and the previous counter value. If a rollover has not been detected, process 200 skips operation 240 and proceeds directly to operation 250. At operation 250, the difference (delta) between the new counter value and the previous counter value is added to the constituent value. At operation 260, the new counter value is copied to the previous counter value. At operation 270, the update value is incremented by one.

Figure 3:
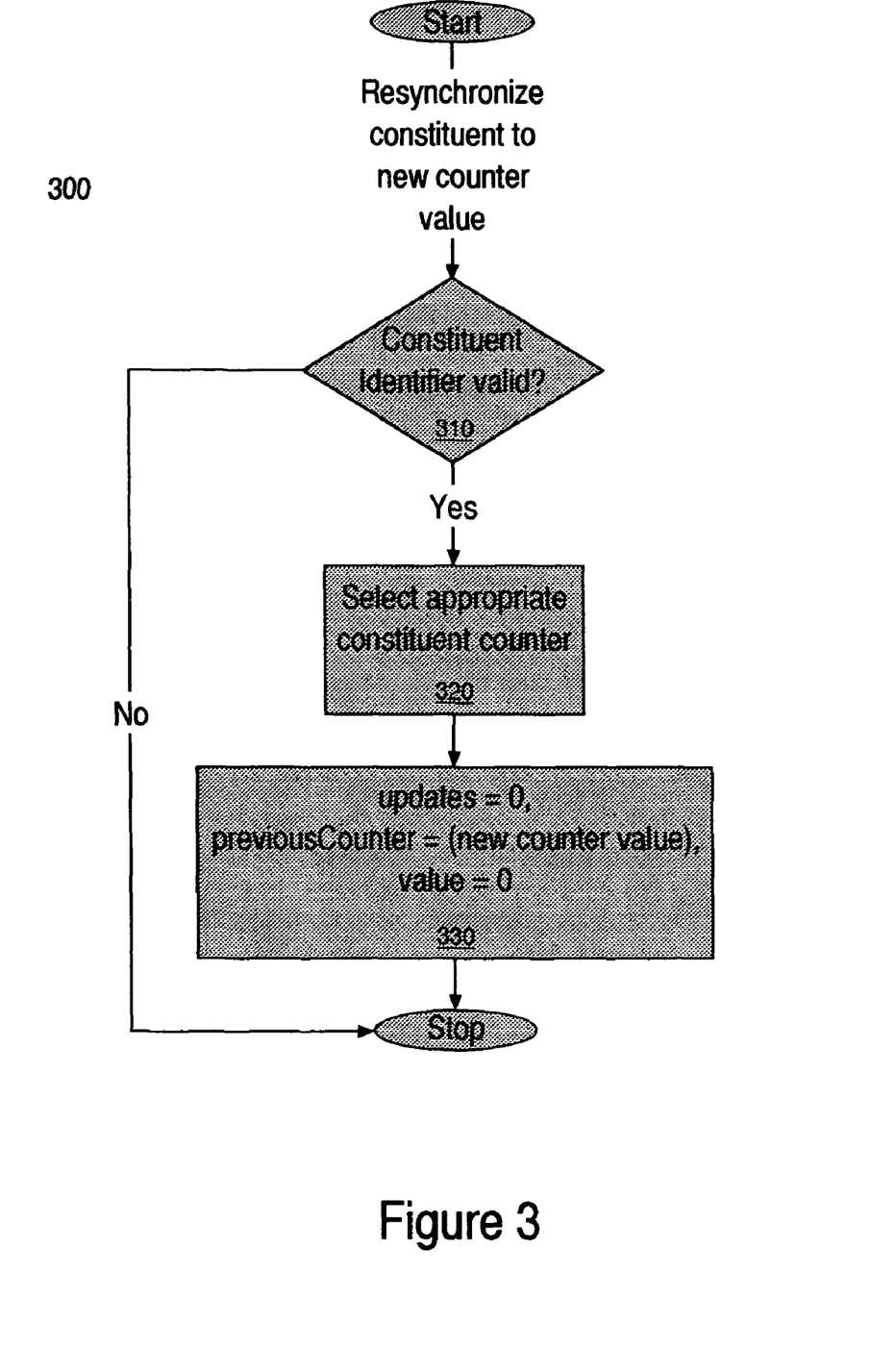
FIG. 3 shows a flowchart of the process 400 for resynchronizing a constituent counter, in accordance with an embodiment of the present invention.

FIG. 3 shows a flowchart of the process 300 for resynchronizing a constituent counter, in accordance with an embodiment of the present invention. At operation 310, a determination is made as to whether the constituent identifier is valid. If the identifier is invalid, process 300 terminates. If the identifier is valid, process 300 proceeds to operation 320, where the appropriate constituent counter is selected. At operation 330, the selected constituent counter is resynchronized by setting its update value to zero, copying the new counter value to its previous counter value, and setting its constituent value to zero.

Figure 4:
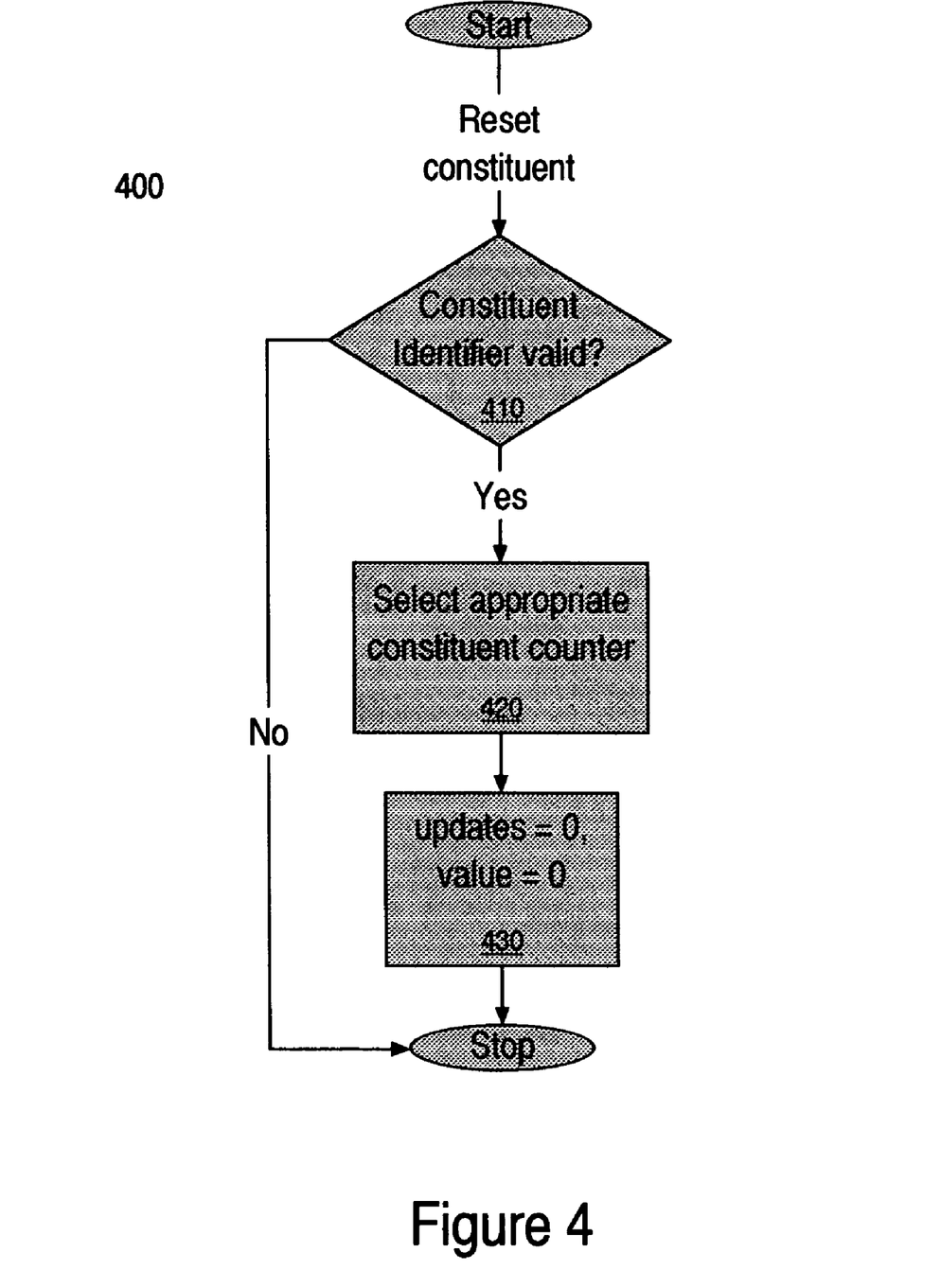
FIG. 4 shows a flowchart of the process 500 for resetting a constituent counter, in accordance with an embodiment of the present invention.

FIG. 4 shows a flowchart of the process 400 for resetting a constituent counter, in accordance with an embodiment of the present invention. At operation 410, a determination is made as to whether the constituent identifier is valid. If the identifier is invalid, process 400 terminates. If the identifier is valid, process 400 proceeds to operation 420, where the appropriate constituent counter is selected. At operation 430, the selected constituent counter is reset by setting its update value to zero and its constituent value to zero.

Figure 5:
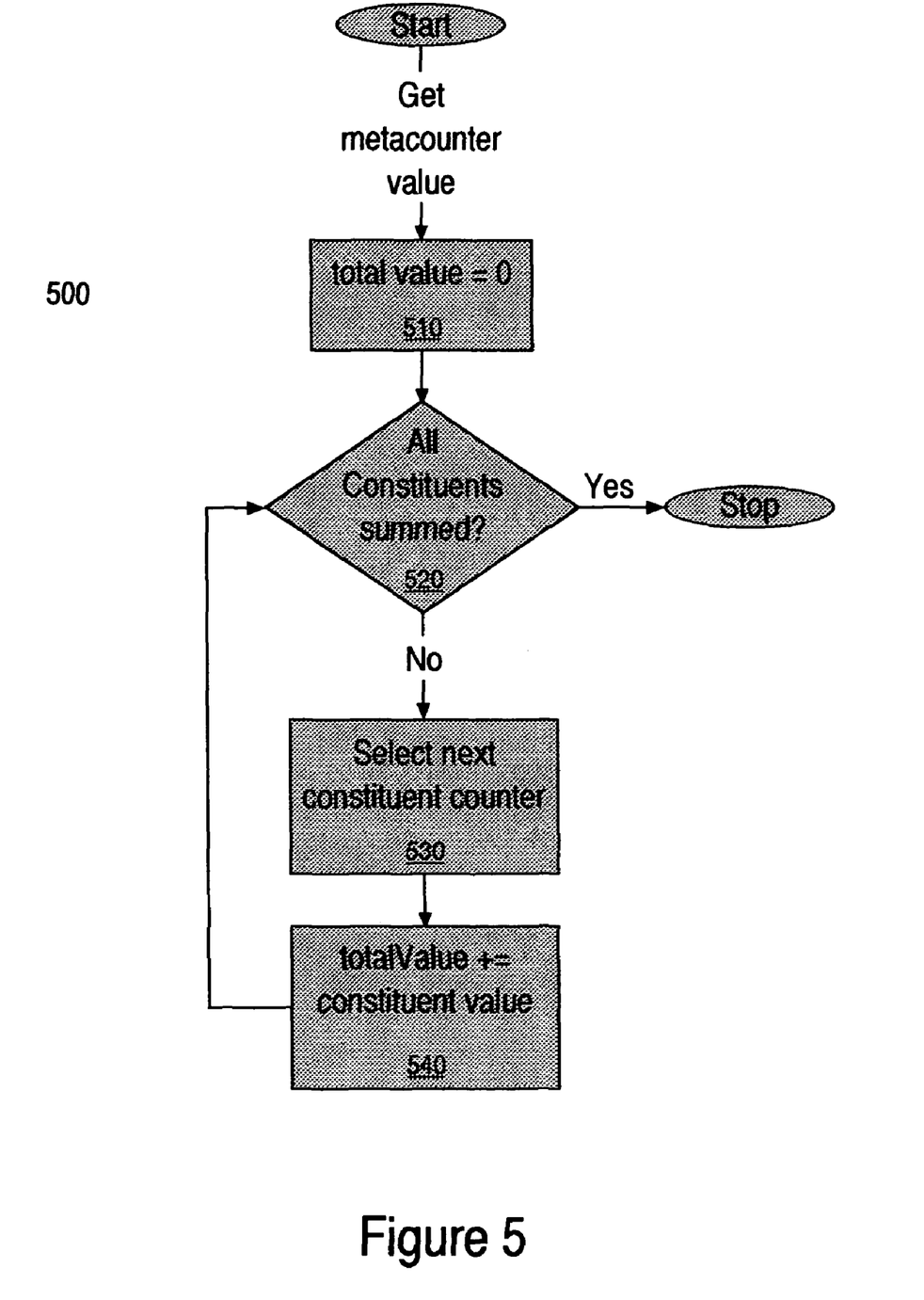
FIG. 5 shows a flowchart of the process for obtaining a metacounter value, in accordance with an embodiment of the present invention.

FIG. 5 shows a flowchart of the process 500 for obtaining a metacounter value, in accordance with an embodiment of the present invention. This process essentially involves summing the constituent values of the metacounter's respective constituent counters. At operation 510, a temporary variable that will hold the total value is reset to zero. At operation 520, a determination is made as to whether all constituent counters have been summed. If they have, process 500 terminates. If they have not, process 500 proceeds to operation 530, where the next constituent counter is selected. At operation 540, the constituent value of the selected constituent counter is added to the temporary variable that will hold the total value of the metacounter.

Figure 6:
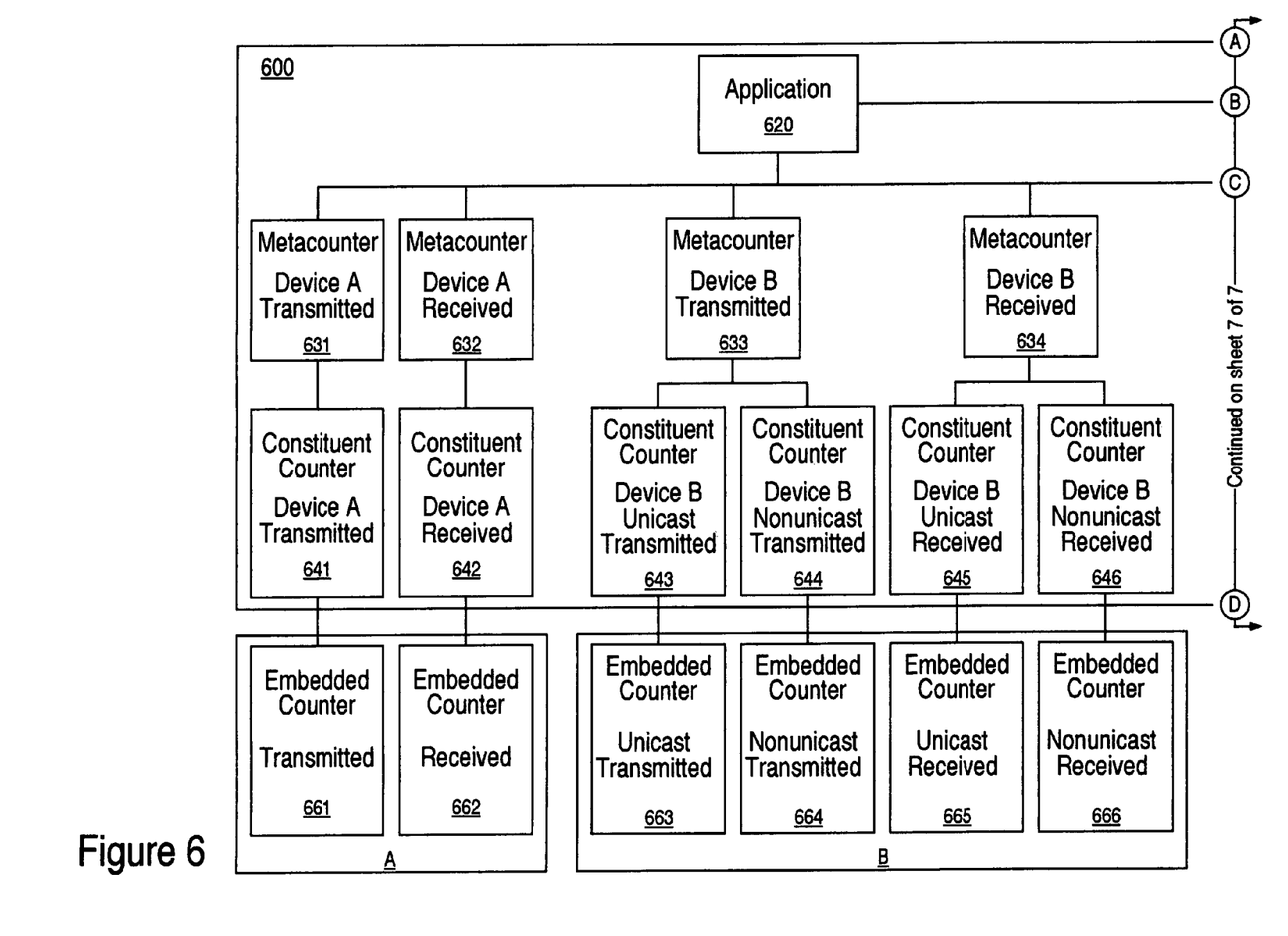
FIG. 6 shows a block diagram of an embodiment as applied to a network management application that wishes to count the number of frames transmitted and received from the interfaces of various device types or models.

One embodiment is directed to a system for abstracting multiple embedded counters from a number of network devices for use in a network monitoring application. FIG. 6 shows a block diagram of an embodiment as applied to a network management application that wishes to count the number of frames transmitted and received from the interfaces of various device types or models.

The system 600 interacts with embedded counters 661-672 contained within network devices A, B, and C. In one embodiment, system 600 includes a metacounter 631-636 for each metacount per network device, wherein each metacounter is communicatively coupled with the application 620. Since in this example there are two metacounts, frames transmitted and frames received, two metacounters will be used for each device, one specific to each metacount. In other words, there will be six metacounters: Device A Transmitted 631, Device A Received 632, Device B Transmitted 633, Device B Received 634, Device C Transmitted 635, and Device C Received 636.

In one embodiment, each metacounter 631-636 also encompasses a number of constituent counters 641-652 for each applicable embedded counter 661-672 within their respective network device, wherein each constituent counter is communicatively coupled with its respective metacounter 631-636 and the respective network device. The constituent counters 641-652 each store a constituent value based on the embedded counter values of their respective embedded counters 661-672 and provide these constituent values to their respective metacounters 631-636. The term "applicable embedded counter" simply refers to an embedded counter that provides information relevant to a particular task. In the example in FIG. 6, network device A offers an embedded counter that tallies all frames transmitted 661 and a second embedded counter that tallies all frames received 662, which are both applicable to the particular task. If, for instance, network device A also had a counter that tallied the number of errors, such a counter would not be applicable. For devices like network device A, the metacounters created would each encompass only one constituent counter as there is no need to further aggregate the values that are provided by the device. Network device B, on the other hand, offers distinct embedded counters for all unicast frames transmitted 663, nonunicast frames transmitted 664, unicast frames received 665, and nonunicast frames received 666. For devices of this type, the metacounters created would each encompass two constituent counters so that unicast and nonunicast frames are aggregated for both the transmit and receive directions. Finally, network device C offers distinct embedded counters for unicast frames transmitted 667, multicast frames transmitted 668, broadcast frames transmitted 669, unicast frames received 670, multicast frames received 671, and broadcast frames received 672. Thus, the metacounters created for network device C, 635 and 636, would each encompass three constituent counters, 647-649 and 650-652 respectively, so that unicast, multicast, and broadcast frames are aggregated for both the transmit and receive directions.

One embodiment also includes a driver module 630 communicatively coupled with the application 620, the metacounters 631-636, and the constituent counters 641-652. The driver module 630 must understand how many physical counters are to be aggregated into each metacounter 631-636 that the application 620 wishes to consume for each specific type of device to be supported. The driver module 630 must also understand how large each constituent embedded counter 661-672 is (e.g. 32 bits versus 64 bits) and how to retrieve each constituent embedded counter value. Thus, the application 620, which presumably performs some type of further analysis or presentation of the resultant metacounter data, needs only to deal with the resulting metacounters 631-636 without regard to how many constituent embedded counters comprise each, how large each constituent counter is, whether the constituent embedded counters have rolled over, etc.

In one embodiment, the metacounters would need an interface that permits their creation with a variant number of internal constituent counters that are encompassed by the metacounter. In one embodiment, it may also be desirable for the interface to provide a way to change this number of constituent counters after creation of a metacounter instance and to create the number of constituent counters encompassed by a metacounter.

When dealing with constituent counter objects directly in a software application, each constituent counter is typically able to remember the last unsigned counter value that was retrieved from the supplying device, along with the delta that has been computed thus far between the original unsigned counter value that was used to initialize the constituent counter object and this last stored unsigned counter value. Such constituent counter objects are typically also capable of "resynchronizing" their previous unsigned counter value on demand and simultaneously resetting their last computed delta (constituent value) in order to begin a new delta computation, and of retrieving both the delta and last retrieved (previous) unsigned counter values. Finally, when an updated (new) unsigned counter value is retrieved from the device, the constituent counter objects are typically capable of "adding" to their delta values by computing the difference between this last retrieved unsigned counter value and the stored (previous) unsigned counter value, adding the difference to the running delta total (the constituent value), and retaining the just-retrieved unsigned counter value for use during the next update. In one embodiment, the counter must deal with rollover of the retrieved value during the addition operation. This occurs when a large unsigned value (e.g. 0xffffffff for a 32-bit counter) is incremented by a relatively small value (e.g. 2), resulting in an updated value that is smaller than the last stored value (e.g. 0x00000001 for a 32-bit counter).

In one embodiment, a means must also be provided by which the driver module can update the constituent counter values distinctly from one another. It is incumbent upon the driver code to correctly sequence these updates so that the correct update is always applied to the appropriate constituent counter. Resynchronization of the constituent counters must also be done on a per-constituent-counter basis by the driver code; the metacounter only provides a construct by which the driver can access the specified constituent counter object, and has no means of guaranteeing that the correct value has been applied to a constituent counter either for updating the counter or resynchronizing it.

The real value of the metacounter construct becomes apparent when performing tasks that the main application (as opposed to the driver module) would undertake, primarily in retrieving the aggregated delta value of a metacounter. Going back to the example given above with the three types of supported devices, each providing different embedded counters that must be combined to produce an overall frame counter, the metacounter shields the software application from the specifics of how a delta value for frame count is derived for each of the three device types. Instead, the application need only deal with the metacounter interface to ask for the aggregated frame count in each case. In one embodiment, a means of resetting the metacounter's delta value (and hence the constituent counter delta values) is also desirable, as the software application can then dictate time boundaries over which it wishes to track delta values independent of the driver code, which simply retrieves the embedded counter values and updates the existing delta count, update count, and previous counter value.

Thus, embodiments of the present invention allow the majority of a software application that is dependent upon embedded physical counters within devices of divergent type or model to be completely independent of the differences in device implementation. Only a driver module must be cognizant of the specifics for each device. This greatly simplifies the design of the majority of the software application, localizing device-specific details within the driver code as they pertain to counter implementation and use.

What is claimed is:

1. A method of abstracting multiple embedded counters from a number of network devices for use in a network monitoring application comprising:
    initializing a metacounter for network devices for categories of metacounts;
    for each metacounter, initializing a constituent counter for each embedded counter associated with that metacounter within the network devices, wherein each said constituent counter comprises a constituent value;
    updating said constituent values for said constituent counters; and
    obtaining a total value for each said metacounter based on a summation of the constituent values of respective constituent counters, wherein said total value is used by said network monitoring application.

2. The method as recited in claim 1 further comprising:
    resynchronizing one of said constituent counters at a user's election.

3. The method as recited in claim 2 wherein said one of said constituent counters further comprises an update value and a previous counter value, and wherein said resynchronizing comprises:
    setting said update value equal to zero;
    setting said previous counter value equal to the value of the respective embedded counter; and
    setting said constituent value equal to zero.

4. The method as recited in claim 1 further comprising:
    resetting one of said constituent counters at a user's election.

5. The method as recited in claim 4 wherein said one of said constituent counters further comprises an update value, and wherein said resetting comprises:
    setting said update value equal to zero; and
    setting said constituent value equal to zero.

6. The method as recited in claim 1 where said initializing of said constituent counter comprises setting said constituent value to zero.

7. The method as recited in claim 6 wherein said constituent counter further comprises an update value and a previous counter value, and wherein said initializing of said constituent counter further comprises:
    setting said update value equal to zero; and
    setting said previous counter value equal to zero.

8. The method as recited in claim 1 wherein said constituent counter further comprises an update value and a previous counter value, and wherein said updating comprises:
    adding a difference between a current value of the respective embedded counter and said previous counter value to said constituent value;
    setting said previous counter value equal to the value of the respective embedded counter; and
    incrementing said update value by one.

9. The method as recited in claim 8 wherein said updating further comprises:
    determining whether the respective embedded counter experienced a rollover;
    provided the respective embedded counter experienced a rollover, manipulating the current value of the embedded counter and said previous counter value to account for a difference between a maximum possible value of said embedded counter and said previous counter value.

10. A system for abstracting multiple embedded counters from a number of network devices for use in a network monitoring application comprising:
    a metacounter for each category of desired counters per network device communicatively coupled with said network monitoring application, said metacounter providing a total value to said network monitoring application; and
    for each metacounter, a constituent counter for each applicable embedded counter within the respective network device, each said constituent counter being configured to store a constituent value received from said applicable embedded counter and provide said constituent value to said metacounter;
    wherein each said metacounter obtains said total value based on summation of the constituent values of the respective constituent counters.

11. The system as recited in claim 10 further comprising:
    a driver module communicatively coupled with said application, said metacounters, and said constituent counters, said driver module controlling said constituent counters.

12. The system as recited in claim 10 wherein said constituent counters are capable of being resynchronized at a user's election.

13. The system as recited in claim 12 wherein one of said constituent counters is resynchronized by setting an update value stored in said one of said constituent counters equal to zero, setting a previous counter value stored in said one of said constituent counters equal to the value of the respective embedded counter, and setting said constituent value equal to zero.

14. The system as recited in claim 10 wherein said constituent counters are capable of being reset at a user's election.

15. The system as recited in claim 14 wherein one of said constituent counters is reset by setting an update value stored in said one of said constituent counters equal to zero and setting said constituent value equal to zero.

16. The system as recited in claim 10 wherein said driver module initializes said one of said constituent counters by setting an update value stored in said one of said constituent counters equal to zero and setting a previous counter value stored in said one of said constituent counters equal to zero.

17. The system as recited in claim 10 wherein each of said constituent counters updates by adding a difference between a current value of the respective embedded counter and a previous counter value stored in said constituent counter to said constituent value, setting said previous counter value equal to the value of the respective embedded counter, and incrementing an update value stored in said constituent counter by one.

18. The system as recited in claim 17 wherein each of said constituent counters determines whether the respective embedded counter experienced a rollover and, provided the respective embedded counter experienced a rollover, manipulates the current value of the embedded counter and said previous counter value to account for a difference between the maximum possible value of said embedded counter and said previous counter value.

19. A non-transitory computer-usable medium having computer-readable program code embodied therein for causing a computer system to perform a method of abstracting multiple embedded counters from a number of network devices for use in a network monitoring application comprising:
- initializing a number of metacounters for network devices for categories of metacounts;
- for each metacounter, initializing a constituent counter for applicable embedded counters within each said network device associated with that metacounter, wherein each said constituent counter comprises a constituent value;
- updating said constituent values for said constituent counters; and
- obtaining a total value for each said metacounter based on a summation of the constituent values of respective constituent counters associated with that metacounter, wherein said total value is used by said network monitoring application.

20. The method as recited in claim 19 further comprising:
resynchronizing one of said constituent counters at a user's election.

21. The method as recited in claim 20 wherein said one of said constituent counters further comprises an update value and a previous counter value, and wherein said resynchronizing comprises:
- setting said update value equal to zero;
- setting said previous counter value equal to the value of the respective embedded counter; and
- setting said constituent value equal to zero.

22. The method as recited in claim 19 further comprising:
resetting one of said constituent counters at a user's election.

23. The method as recited in claim 22 wherein said one of said constituent counters further comprises an update value, and wherein said resetting comprises:
- setting said update value equal to zero; and
- setting said constituent value equal to zero.

24. The method as recited in claim 19 where said initializing of said constituent counter comprises setting said constituent value to zero.

25. The method as recited in claim 24 wherein said constituent counter further comprises an update value and a previous counter value, and wherein said initializing of said constituent counter further comprises:
- setting said update value equal to zero; and
- setting said previous counter value equal to zero.

26. The method as recited in claim 19 wherein said constituent counter further comprises an update value and a previous counter value, and wherein said updating comprises:
- adding a difference between a current value of the respective embedded counter and said previous counter value to said constituent value;
- setting said previous counter value equal to the value of the respective embedded counter; and
- incrementing said update value by one.

27. The method as recited in claim 26 wherein said updating further comprises:
- determining whether the respective embedded counter experienced a rollover;
- provided the respective embedded counter experienced a rollover, manipulating the current value of the embedded counter and said previous counter value to account for a difference between the maximum possible value of said embedded counter and said previous counter value.

* * * * *

UNITED STATES PATENT AND TRADEMARK OFFICE
CERTIFICATE OF CORRECTION

| | | |
|---|---|---|
| PATENT NO. | : 8,108,511 B2 | Page 1 of 1 |
| APPLICATION NO. | : 11/441694 | |
| DATED | : January 31, 2012 | |
| INVENTOR(S) | : Steven V. Britt | |

It is certified that error appears in the above-identified patent and that said Letters Patent is hereby corrected as shown below:

In column 8, line 40, in Claim 10, after "based on" insert -- a --.

Signed and Sealed this
Fourth Day of December, 2012

David J. Kappos
*Director of the United States Patent and Trademark Office*